United States Patent
Gu et al.

(10) Patent No.: US 11,940,228 B2
(45) Date of Patent: Mar. 26, 2024

(54) HIGH-TEMPERATURE FLUID TRANSPORTING PIPELINE WITH HEAT EXCHANGE APPARATUS INSTALLED THEREIN, SUITABLE HEAT EXCHANGE APPARATUS AND HEAT EXCHANGE METHOD

(71) Applicant: L'Air Liquide, Société Anonyme pour l'Etude et l'Exploitation des Procédés Georges Claude, Paris (FR)

(72) Inventors: Yuquan Gu, Shanghai (CN); Peter Van Kampen, Canton, GA (US); KuoHsuan Wang, Shanghai (CN); Aili Zhang, Shanghai (CN); Wenbiao Zhou, Shanghai (CN)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 31 days.

(21) Appl. No.: 17/555,032

(22) Filed: Dec. 17, 2021

(65) Prior Publication Data
US 2022/0205728 A1 Jun. 30, 2022

(30) Foreign Application Priority Data
Dec. 30, 2020 (CN) .......................... 202011604773.2

(51) Int. Cl.
*F27D 17/00* (2006.01)
*F28D 7/02* (2006.01)

(52) U.S. Cl.
CPC ........... *F28D 7/024* (2013.01); *F27D 17/004* (2013.01)

(58) Field of Classification Search
CPC .. F28D 21/0003; F28D 7/0066; F28D 7/0083; F28D 7/024; F28F 1/003; F27D 17/004
See application file for complete search history.

(56) References Cited

U.S. PATENT DOCUMENTS

| 2,723,108 A | 11/1955 | Butler et al. |
| 3,756,268 A | 9/1973 | Lefever et al. |

(Continued)

FOREIGN PATENT DOCUMENTS

| CN | 100575788 C | 12/2009 |
| CN | 100575788 C | 12/2009 |

(Continued)

OTHER PUBLICATIONS

European Search Report and Written Opinion for corresponding EP 21214121.2, dated May 6, 2022.

*Primary Examiner* — Eric S Ruppert
(74) *Attorney, Agent, or Firm* — Elwood L. Haynes

(57) ABSTRACT

The present invention discloses a high-temperature fluid transporting pipeline with a heat exchange apparatus installed therein, a suitable heat exchange apparatus and a heat exchange method, wherein heat contained in a high-temperature fluid can be recovered during the transportation thereof. The heat exchange apparatus comprises a heat exchange body inserted into the high-temperature fluid transporting pipeline, and a heat-receiving fluid coil installed therein. The method of heat exchange is that the high-temperature fluid heats an auxiliary fluid in a heat exchange cavity via a heat exchange panel of the heat exchange body in contact therewith, and the heated auxiliary fluid then conducts the heat to a heat-receiving fluid in the heat-receiving fluid coil. As an example, the high-temperature fluid is flue gas generated by combustion, the heat exchange apparatus of the present invention is inserted into a flue gas transporting pipeline, the auxiliary fluid is an inert gas such as air, and the air heated indirectly by the high-temperature flue gas conducts heat to fuel and/or oxygen-enriched gas (serving as an oxidant/combustion aid) flowing in the heat-receiving fluid coil.

5 Claims, 2 Drawing Sheets

(56) References Cited

U.S. PATENT DOCUMENTS

| | | | |
|---|---|---|---|
| 4,318,367 A | 3/1982 | Antonucci | |
| 4,545,293 A | 10/1985 | Munz | |
| 2004/0194940 A1 | 10/2004 | Manasek et al. | |
| 2009/0298002 A1* | 12/2009 | Constantin | F28D 15/00 165/104.34 |
| 2012/0144814 A1* | 6/2012 | Won | F01M 5/001 60/320 |
| 2014/0165558 A1 | 6/2014 | Birgler et al. | |
| 2014/0196873 A1 | 7/2014 | Weber et al. | |
| 2014/0208725 A1 | 7/2014 | Schweizer et al. | |
| 2016/0320057 A1 | 11/2016 | Jarry et al. | |
| 2018/0112916 A1 | 4/2018 | Jia | |
| 2019/0003706 A1 | 1/2019 | Kang et al. | |

FOREIGN PATENT DOCUMENTS

| | | |
|---|---|---|
| CN | 102132947 | 7/2011 |
| CN | 105219410 | 1/2016 |
| CN | 105545819 | 5/2016 |
| CN | 106482533 | 1/2019 |
| CN | 209655881 U | 11/2019 |
| CN | 212227204 U | 12/2020 |
| CN | 212585547 U | 2/2021 |
| CN | 214950753 U | 11/2021 |
| DE | 82 33 504 U1 | 7/1984 |
| DE | 20 2004 008737 U1 | 10/2004 |
| DE | 10 2017 209725 | 12/2018 |
| EP | 2 192 368 | 6/2010 |
| EP | 3 355 018 | 8/2018 |
| FR | 3 015 637 | 6/2015 |
| GB | 2 421 071 | 6/2006 |
| JP | S48 88007 | 11/1973 |
| JP | S56 167861 | 12/1981 |
| JP | S58 66713 | 4/1983 |
| JP | S59 18376 | 1/1984 |
| JP | S63 163783 | 7/1988 |
| JP | S63 300019 | 12/1988 |
| JP | H06 62215 | 8/1994 |
| JP | H11 166398 | 6/1999 |
| JP | 2001 041681 | 2/2001 |
| JP | 2002 162185 | 6/2002 |
| JP | 2005 076175 | 3/2005 |
| JP | 2006 029667 | 2/2006 |
| JP | 2008 249273 | 10/2008 |
| JP | 2014 139504 | 7/2014 |
| JP | 2020 525748 | 8/2020 |

\* cited by examiner

HIGH-TEMPERATURE FLUID TRANSPORTING PIPELINE WITH HEAT EXCHANGE APPARATUS INSTALLED THEREIN, SUITABLE HEAT EXCHANGE APPARATUS AND HEAT EXCHANGE METHOD

CROSS REFERENCE TO RELATED APPLICATIONS

This application claims the benefit of Chinese Patent Application No. 202011604773.2, filed Dec. 30, 2020, the entire contents of which are incorporated herein by reference.

BACKGROUND

Technical Field

The present invention relates to the field of high-temperature fluid heat recovery, in particular to the recovery of heat from hot flue gas of a glass melting furnace for the purpose of heating a fuel and/or an oxygen-enriched gas.

Background Art

Protecting the environment, saving energy, conserving land and reducing costs are issues of concern in modern industrial development. Various technical processes such as metallurgy, glass melting and industrial chemical production need to consume large amounts of energy, at the same time generating products or by-products containing large amounts of thermal energy. For example, flue gas or steam generated during combustion, syngas and steam generated by natural gas reforming, etc. are all high-temperature fluids containing large amounts of thermal energy. If the thermal energy in these high-temperature fluids cannot be recovered, the result will be considerable wastage of energy and production efficiency.

Taking panel glass production as an example, in the prior art, many kilns operate via oxygen-enriched combustion, and this means that combustion no longer takes place between fuel and air (air combustion) but instead takes place between fuel and oxygen-enriched gas with a higher oxygen concentration than air. Using exhaust gas from combustion products, i.e. flue gas, to preheat the fuel and/or oxygen-enriched gas enables the recovery of some of the energy contained in the flue gas, and can also increase the energy efficiency of such combustion. In the case of oxygen-enriched combustion, the energy contained in flue gas accounts for 30% of the energy consumed.

CN100575788C disclosed an indirect heat exchanger. In a heat exchange region, hot flue gas heats an inert gas contained in a hermetic apparatus first, then the hot inert gas further heats a combustion gas located in another of the airtight apparatuses. This design requires the addition of a new heat exchange region outside an existing flue gas pipeline of the factory; because the amount of space occupied is increased, the cost of investment is increased, so this design is not widely applied in practice.

SUMMARY OF THE INVENTION

An object of the present invention is to overcome the shortcomings of the prior art, modifying an existing horizontally arranged high-temperature fluid pipeline, e.g. a flue gas pipeline, in a factory so as to integrate a heat exchange apparatus with the pipeline, thus achieving the technical effects of recovering thermal energy to the maximum extent, saving space and reducing cost input.

In one aspect, the present invention provides a high-temperature fluid transporting pipeline, wherein a heat exchange body of at least one heat exchange apparatus is inserted into the interior of the high-temperature fluid transporting pipeline.

The heat exchange apparatus comprises the heat exchange body located completely within the transporting pipeline, and a heat-receiving fluid inlet pipeline, a heat-receiving fluid outlet pipeline, an auxiliary fluid inlet pipeline and an auxiliary fluid outlet pipeline, all of which extend out of a casing of the transporting pipeline; the heat exchange body comprises a heat exchange cavity enclosed by a heat exchange panel, and a heat-receiving fluid coil is installed in the heat exchange cavity.

Optionally, the heat-receiving fluid inlet pipeline is sequentially in communication with a heat-receiving fluid inlet distributor and an inlet of the heat-receiving fluid coil located inside the heat exchange cavity, and the heat-receiving fluid outlet pipeline is sequentially in communication with a heat-receiving fluid outlet distributor and an outlet of the heat-receiving fluid coil located inside the heat exchange cavity. Optionally, the heat-receiving fluid inlet and outlet distributors each comprise primary and secondary distributors. Optionally, a temperature sensor is provided on the heat-receiving fluid outlet pipeline and/or the heat-receiving fluid outlet distributor.

The auxiliary fluid inlet pipeline and auxiliary fluid outlet pipeline are in communication with the heat exchange cavity. A gas component analyser is provided at an auxiliary fluid outlet, for the purpose of ensuring that there is no leakage of heat-receiving fluid in the heat exchange cavity.

To facilitate installation, an installation hole is provided in the casing of the transporting pipeline, the heat exchange body of the heat exchange apparatus is inserted into the interior of the transporting pipeline through the installation hole, a gap between the heat exchange apparatus and the installation hole is sealed using a sealing refractory material, and a supporting structure is further included outside the transporting pipeline for the purpose of supporting the heat exchange apparatus. The sealing refractory material comprises one of ceramic fiber, glass fiber and refractory mortar, or a combination of more than one thereof.

Optionally, the materials of the heat exchange panel, the heat-receiving fluid coil, and the outlet/inlet pipelines for the heat-receiving fluid and auxiliary fluid comprise stainless steel or aluminum. The material of the casing of the transporting pipeline comprises refractory bricks.

Optionally, in the high-temperature fluid transporting pipeline, the heat-receiving fluid flows in the heat-receiving fluid coil, the auxiliary fluid flows or is stationary in the heat exchange cavity, and the heat-receiving fluid is heated by a high-temperature fluid through heat conduction by the auxiliary fluid and heat radiation by a heat exchange panel.

Optionally, in the high-temperature fluid transporting pipeline, the high-temperature fluid comprises flue gas generated by combustion and/or thermal cracking, the auxiliary fluid comprises one of air, $N_2$ and $CO_2$ or a combination of more than one thereof, and the heat-receiving fluid comprises $O_2$, natural gas or other fuel gases.

In another aspect, the present invention further discloses a heat exchange apparatus suitable for the high-temperature fluid transporting pipeline according to Claim 1, characterized in that the heat exchange apparatus comprises a heat exchange body located completely within the transporting pipeline, and a heat-receiving fluid inlet pipeline, a heat-receiving fluid outlet pipeline, an auxiliary fluid inlet pipeline and an auxiliary fluid outlet pipeline, which all extend out of a casing of the transporting pipeline; the heat exchange body comprises a heat exchange cavity enclosed by a heat exchange panel, and a heat-receiving fluid coil is installed in the heat exchange cavity.

Optionally, in the heat exchange apparatus, the heat-receiving fluid inlet pipeline is sequentially in communication with a heat-receiving fluid inlet distributor and an inlet of the heat-receiving fluid coil located inside the heat exchange cavity, and the heat-receiving fluid outlet pipeline is sequentially in communication with a heat-receiving fluid outlet distributor and an outlet of the heat-receiving fluid coil located inside the heat exchange cavity. Optionally, the heat-receiving fluid inlet and outlet distributors each comprise primary and secondary distributors. Optionally, a temperature sensor is provided on the heat-receiving fluid outlet pipeline and/or the heat-receiving fluid outlet distributor.

Optionally, in the heat exchange apparatus, the auxiliary fluid inlet pipeline and auxiliary fluid outlet pipeline are in communication with the heat exchange cavity. A gas component analyser is provided at the auxiliary fluid outlet, for the purpose of ensuring that there is no leakage of heat-receiving fluid in the heat exchange cavity.

Optionally, the materials of the heat exchange panel, the heat-receiving fluid coil, and the outlet/inlet pipelines for the heat-receiving fluid and auxiliary fluid comprise stainless steel or aluminum.

In another aspect, the present invention further discloses a heat exchange method, characterized in that a heat exchange apparatus as described above is provided, such that a heat-receiving fluid flows in the heat-receiving fluid coil, an auxiliary fluid flows or is stationary in the heat exchange cavity, and the heat-receiving fluid is heated by a high-temperature fluid through heat conduction by the auxiliary fluid and heat radiation by the heat exchange panel.

Optionally, the high-temperature fluid comprises flue gas generated by combustion and/or thermal cracking. The auxiliary fluid comprises one of air, $N_2$, $CO_2$ and steam or a combination of more than one thereof, and the heat-receiving fluid comprises $O_2$, natural gas or another fuel gas.

Optionally, the temperature range of the flue gas is 500-1200° C., and the temperature range of the heat-receiving fluid is 300-600° C. The range of flow rates of the heat-receiving fluid is 5-100 m/s, preferably 20-60 m/s; and the range of flow rates of the auxiliary fluid is 0-50 m/s, preferably 20-30 m/s.

The use of the technical solution of the present invention will produce several beneficial technical effects.

Firstly, the design of the heat exchange apparatus in the present invention makes the modification of an existing transporting pipeline and the installation of the new apparatus very convenient, and can increase the heat exchange area while reducing costs, thus increasing the heat exchange efficiency.

Secondly, multiple heat exchange apparatuses can be installed in parallel, and the multiple heat exchange apparatuses can heat the same type of heat-receiving fluid, or different types of heat-receiving fluids.

Thirdly, the heat exchange apparatus employs a method of indirect heating, and the use of the auxiliary fluid, temperature sensor and gas component analyser, etc. increases the safety and controllability of the heat exchange apparatus.

BRIEF DESCRIPTION OF THE DRAWINGS

The drawings in the present disclosure merely serve to illustrate the present invention, such that the spirit of the present invention can be understood and explained, but do not limit the present invention in any respect.

LIST OF REFERENCE SYMBOLS

Figure 1:
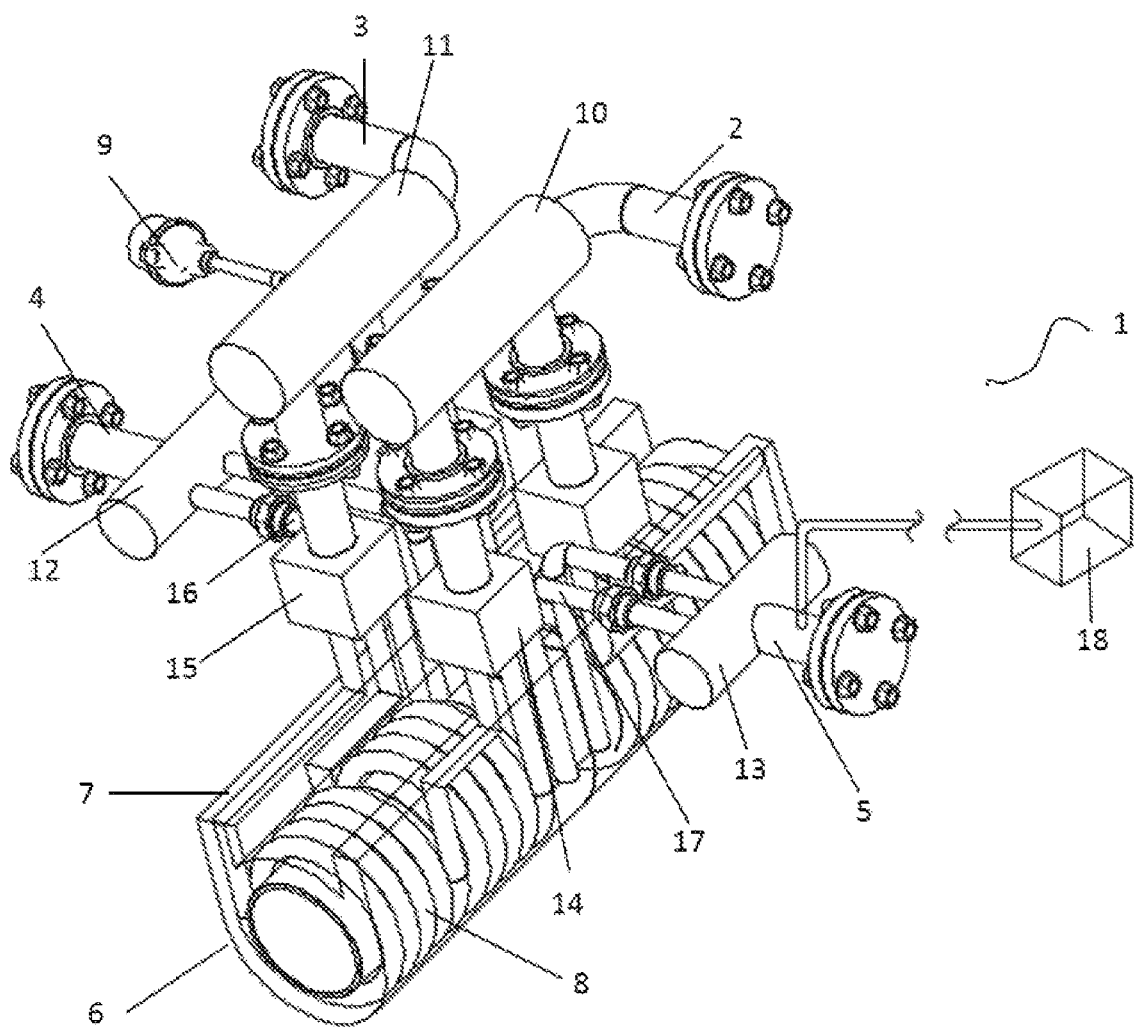
FIG. 1 is a three-dimensional structural drawing of a heat exchange apparatus.
Figure 2:
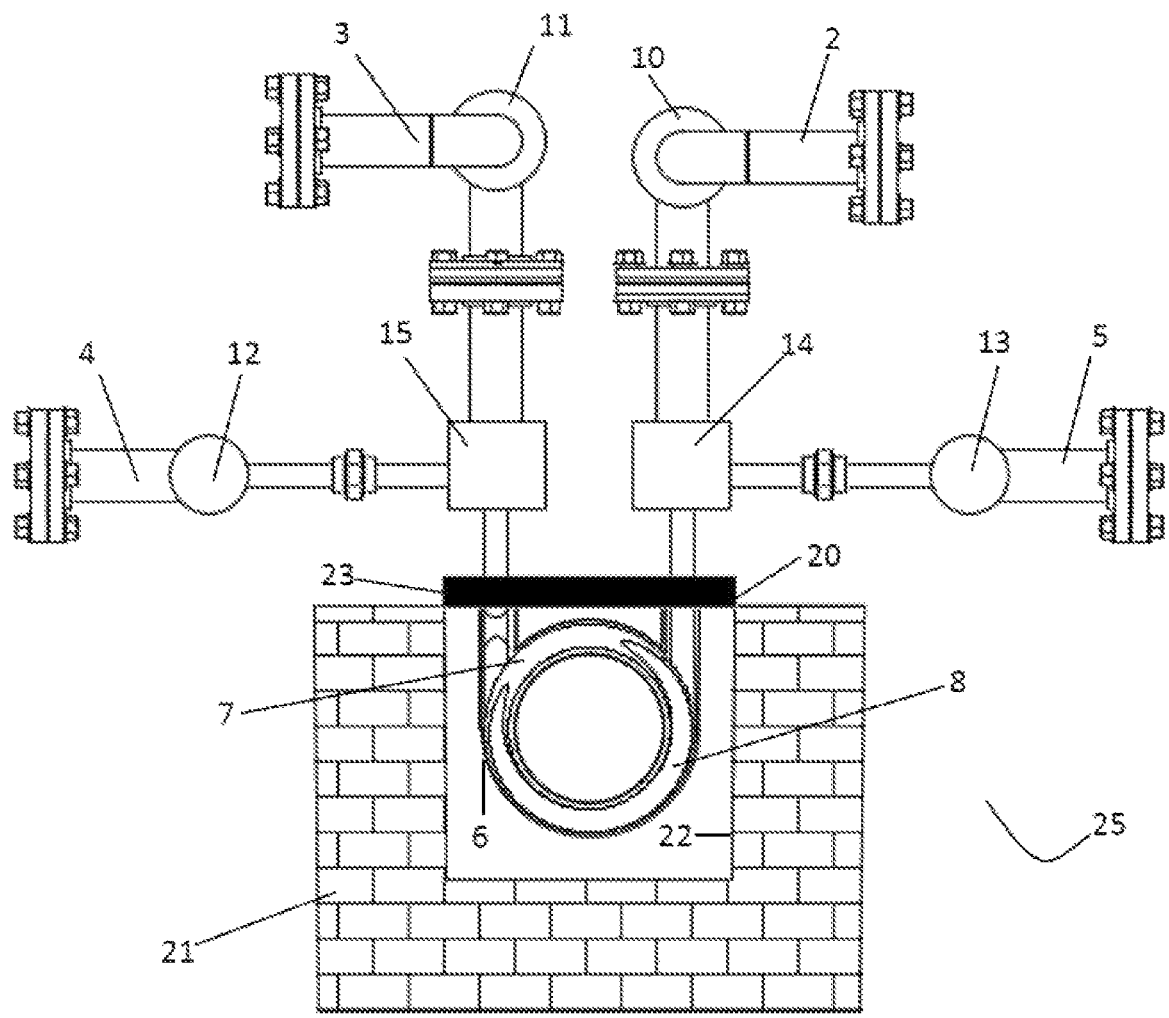
FIG. 2 is a sectional drawing of the heat exchange apparatus after installation on the high-temperature fluid transporting pipeline.

FIGS. 1-2 are embodiments according to the present invention, wherein identical references represent corresponding parts in the two figures.

Key to the drawings: 1—heat exchange body, 2—heat-receiving fluid inlet pipeline, 3—heat-receiving fluid outlet pipeline, 4—auxiliary fluid inlet pipeline, 5—auxiliary fluid outlet pipeline, 6—heat exchange panel, 7—heat exchange cavity, 8—heat-receiving fluid coil, 9—temperature sensor, 10—primary heat-receiving fluid inlet distributor, 11—primary heat-receiving fluid outlet distributor, 12—auxiliary fluid inlet distributor, 13—auxiliary fluid outlet distributor, 14—secondary heat-receiving fluid inlet distributor, 15—secondary heat-receiving fluid outlet distributor, 16—auxiliary fluid inlet branch pipe, 17—auxiliary fluid outlet branch pipe, 18—gas component analyser, 20—installation hole, 21—refractory bricks, 22—transporting pipeline casing, 23—sealing refractory material, 25—high-temperature fluid transporting pipeline.

Notations and Nomenclature

In the present invention, it should be understood that orientational or positional relationships indicated by terms such as "up", "down", "front", "rear", "perpendicular", "parallel", "top", "bottom", "inner" and "outer" are based on the orientational or positional relationships shown in the drawings, and use a horizontal plane as a reference.

Unless otherwise stated, qualifiers similar to "a" appearing herein do not indicate a definition of quantity, but describe technical features distinguished from one another. Similarly, modifiers similar to "about" and "approximately" appearing in front of numerals herein generally include the number itself, and the specific meaning thereof should be understood in conjunction with the meaning of the context. Unless modified by a specific quantifying measure word, nouns herein should be regarded as including both singular and plural forms, i.e. the technical solution may include a single one of the technical feature concerned, but may also include a plurality of the technical feature.

In the present invention, unless otherwise clearly specified and defined, terms such as "installed", "connected together", "connected", "in communication" and "fixed" should be understood in a broad sense, e.g. may mean connected in a fixed manner, but may also mean removably connected, or forming a single piece; may mean mechanically connected; may mean directly connected together, but may also mean connected indirectly via an intermediate medium; and may mean internal communication between two elements, or an interactive relationship between two elements. Those skilled in the art can understand the specific meaning of the above terms in the present invention according to the specific circumstances.

The high-temperature fluid in the present invention may have various forms and compositions, including gases as well as liquids; and may be a single component or a mixture.

High-temperature means that the temperature thereof is higher than the temperature of the fluid being heated, with a range of variation of 100-1500° C. When the high-temperature fluid is a gas such as flue gas, the pipeline for transporting same is generally formed of refractory bricks; when the high-temperature fluid is a liquid, the casing of the pipeline for transporting same is often formed of metal. The present invention is suitable for the modification of various high-temperature fluid transporting pipelines arranged substantially horizontally. In the process of modification, an installation hole is made in a part of the pipeline that lies above a horizontal plane through the central axis, and a heat exchange body of the heat exchange apparatus of the present invention is inserted into the interior of the transporting pipeline through the installation hole.

DESCRIPTION OF PREFERRED EMBODIMENTS

As shown in FIG. 1, the heat exchange apparatus of the present invention comprises a heat exchange body 1 that extends completely into a high-temperature fluid transporting pipeline 25; an entire outer surface of the heat exchange body 1 is formed by a heat exchange panel 6 suitable for conducting heat, the heat exchange panel 6 enclosing a hermetic heat exchange cavity 7, with a heat-receiving fluid coil 8 being installed in the heat exchange cavity 7. The heat-receiving fluid coil 8 is not in direct contact with the heat exchange panel 6. The heat-receiving fluid coil 8 can be helically coiled, or folded back and forth. In FIG. 1, the heat exchange body 1 has a hollow annular structure; the high-temperature fluid not only comes into contact with the heat exchange panel 6 along a periphery of the heat exchange body 1, but can also pass through the space in the middle, transferring heat to the heat exchange panel 6. The heat-receiving fluid coil 8 is coiled helically in the heat exchange cavity 7 with the central axis of the annular structure as a middle axis, and with the rings fitted against each other as closely as possible. This design has the advantages of a large heat exchange area and high heat exchange efficiency. A secondary heat-receiving fluid inlet distributor 14, a secondary heat-receiving fluid outlet distributor 15, an auxiliary fluid inlet branch pipe 16 and an auxiliary fluid outlet branch pipe 17 are separately connected to the top of the heat exchange body 1. The greater parts of the secondary distributors and branch pipes extend out of a casing 22 of the high-temperature fluid transporting pipeline 25, and are connected to other pipelines, distributors, etc. via structures such as flanges and screws.

The various parts mentioned above are manufactured by a method of integral forming or welding, and are installed in one piece. Specifically, an installation hole 20 is made at the top of the substantially horizontally arranged high-temperature fluid transporting pipeline 25; if this is a high-temperature flue gas pipeline formed of refractory bricks 21, then some of the refractory bricks 21 at the top thereof are removed. The heat exchange body 1 is inserted into the interior of the high-temperature fluid transporting pipeline 25 through the installation hole 20, and a sealing refractory material 23 such as ceramic fiber, glass fiber or refractory mortar is stuffed into a gap at the installation hole to achieve sealing. These materials also serve to provide thermal isolation and limit shifting of the heat exchange body 1. One end of the secondary heat-receiving fluid inlet distributor 14 is connected via a flange to a primary heat-receiving fluid inlet distributor 10 and a heat-receiving fluid inlet pipeline 2; one end of the secondary heat-receiving fluid outlet distributor 15 is connected via a flange to a primary heat-receiving fluid outlet distributor 11 and a heat-receiving fluid outlet pipeline 3. The auxiliary fluid inlet branch pipe 16 is connected to an auxiliary fluid inlet distributor 12 and an auxiliary fluid inlet pipeline 4; the auxiliary fluid outlet branch pipe 17 is connected to an auxiliary fluid outlet distributor 13 and an auxiliary fluid outlet pipeline 5. Those parts which extend out of the high-temperature fluid transporting pipeline are wrapped in a material such as blanket insulation, sponge insulation or rubber insulation (not shown in the figures) to reduce heat dissipation, and are kept stable by a supporting structure (not shown in the figures). The supporting structure can be fixed to the high-temperature fluid transporting pipeline 25 or the floor.

A temperature sensor 9 is optionally installed on the heat-receiving fluid outlet pipeline 3 or the heat-receiving fluid outlet distributor (15 or 11). Outside the heat exchange apparatus, a heat-receiving fluid delivery system (not shown in the figures) connected to the heat-receiving fluid inlet pipeline 2 and the heat-receiving fluid outlet pipeline 3 is also included. The system comprises, inter alia, a heat-receiving fluid controller and a valve capable of adjusting the flow rate of the heat-receiving fluid. The heat-receiving fluid controller can receive a heat-receiving fluid outlet temperature from the temperature sensor 9, and on this basis can adjust the flow rate (or flow speed), temperature and pressure, etc. of the heat-receiving fluid.

Outside the heat exchange apparatus, an auxiliary fluid delivery system connected to the auxiliary fluid inlet pipeline 4 and the auxiliary fluid outlet pipeline 5 is also included. The system comprises, inter alia, an auxiliary fluid controller and a valve capable of adjusting the flow rate of the auxiliary fluid (not shown in the figures). The auxiliary fluid flows within the heat exchange cavity 7, in a space outside the heat-receiving fluid coil 8. The auxiliary fluid controller can also receive a heat-receiving fluid outlet temperature from the temperature sensor 9, and on this basis can adjust the flow rate (or flow speed), temperature and pressure, etc. of the auxiliary fluid.

The heat exchange apparatus of the present invention adopts a method of indirect heat exchange. High-temperature fluid in the transporting pipeline first heats the heat exchange panel 6 by conduction, radiation and convection, etc.; the heat exchange panel 6 then heats the auxiliary fluid in contact therewith by conduction and radiation, etc. The heated auxiliary fluid flows or is stationary around the heat-receiving fluid coil 8, and thus further conducts heat to the heat-receiving fluid in the coil. When the heat-receiving fluid comprises a substance that is reactive, corrosive or otherwise dangerous at high temperatures, e.g. $O_2$, $CH_4$, etc., the use of indirect heat exchange greatly increases the safety of the heat exchange process. This is because inert air, steam, $N_2$ or $CO_2$, etc. can be chosen as the auxiliary fluid, and the heat exchange panel 6 is not likely to suffer corrosion, aging or other damage when heated in an inert atmosphere, so safety incidents such as leakage will not occur. Stainless steel, aluminum or ceramic fiber and other suitable materials may be selected as the material of the heat exchange panel and heated coil.

The choice of material for each part of the heat exchange apparatus of the present invention (including component composition, thickness, strength and finish, etc.) depends on the nature of the fluid in contact therewith and conditions such as temperature and pressure during operation. For example, the heat exchange panel 6 needs to have excellent thermal conduction properties, and can tolerate rapid variation of temperature within a large range. A tube wall of the heat-receiving fluid coil 8 not only needs to have good thermal conduction properties, but also must not react with the heat-receiving fluid within the range of temperatures that might be reached during use. When the heat-receiving fluid is $O_2$ or an oxygen-enriched gas (i.e. a mixed gas with an oxygen content higher than the content of $O_2$ in air, optionally higher than 50%, and further higher than 80%), the material in contact therewith must not burn in a hot oxygen atmosphere, and is resistant to corrosion and oxidation.

The heat exchange efficiency of the heat exchange apparatus and the temperature of the heat-receiving fluid outlet can be regulated in various ways. When the temperature and flow speed of the high-temperature fluid in the pipeline remain substantially the same, if the flow rate and flow speed of the auxiliary fluid are increased, the temperature of the auxiliary fluid after being heated will fall, and correspondingly the temperature of the heat-receiving fluid will also fall; if the auxiliary fluid is a gas, increasing the pressure thereof will cause the density thereof to increase, thereby increasing the heat transfer efficiency. Similarly, as long as other conditions remain unchanged, if the flow speed or flow rate of the heat-receiving fluid is increased, the outlet temperature thereof will also fall.

In order to prevent leakage due to corrosion or aging of the heat-receiving fluid coil 8 under heated conditions, a gas component analyser 18 is provided at the auxiliary fluid outlet pipeline 5; if the determined gas components are not the same as the components of the auxiliary fluid and the heat-receiving fluid content is increased, this indicates that the heat-receiving fluid coil has suffered damage or leakage. In this case, it is advisable to immediately stop using the heat exchange apparatus, and carry out maintenance.

In an embodiment, flue gas generated by combustion is passed into the transporting pipeline, the main components of the flue gas being carbon dioxide, water, carbon monoxide, sulfur dioxide and nitrogen oxides, etc., with a range of temperature variation of 500-1200° C.; the heat-receiving fluid is $O_2$, and air is chosen as the auxiliary fluid. The flow rates, flow speeds and pressures, etc. of the heat-receiving fluid and auxiliary fluid are each controlled by controllers in their respective delivery systems. The range of variation of the flow rate of the heat-receiving fluid is 5-100 m/s, preferably 20-60 m/s; the range of variation of the flow rate of the auxiliary fluid is 0-50 m/s, preferably 20-30 m/s. It is expected that the range of variation of the temperature capable of being attained by $O_2$ through heating is 300-600° C.

The present invention is not limited to the illustrated examples and embodiments described; various equivalent modifications and substitutions made by those skilled in the art on the basis of this text shall be included in the scope defined by the claims of the present application.

What is claimed is:

1. A method for using a high-temperature fluid in a transporting pipeline to heat a heat-receiving fluid, comprising:
   a) providing a heat exchange apparatus, the heat exchange apparatus comprising a heat exchange body located completely within the transporting pipeline, and a heat-receiving fluid inlet pipeline, a heat-receiving fluid outlet pipeline, an auxiliary fluid inlet pipeline and an auxiliary fluid outlet pipeline, which all extend out of a casing of the transporting pipeline; the heat exchange body comprises a heat exchange cavity enclosed by a heat exchange panel, and a heat-receiving fluid coil is installed in the heat exchange cavity;
   wherein an installation hole is provided in the casing of the transporting pipeline, the heat exchange body of the heat exchange apparatus is inserted into the interior of the transporting pipeline through the installation hole, a gap between the heat exchange apparatus and the installation hole is sealed using a sealing refractory material, and a supporting structure is further included outside the transporting pipeline for the purpose of supporting the heat exchange apparatus, and
   b) providing a heat-receiving fluid and an auxiliary fluid, wherein the heat-receiving fluid flows in the heat-receiving fluid coil, the auxiliary fluid flows or is stationary in the heat exchange cavity, and the heat-receiving fluid is heated by the high-temperature fluid through heat conduction by the auxiliary fluid and heat radiation by the heat exchange panel.

2. The method according to claim 1, wherein the high-temperature fluid comprises flue gas generated by combustion and/or thermal cracking.

3. The method according to claim 1, wherein the auxiliary fluid comprises one of air, $N_2$ and $CO_2$ or a combination of more than one thereof, and the heat-receiving fluid comprises $O_2$, natural gas or other fuel gases.

4. The method according to claim 2, wherein the temperature range of the flue gas is 500-1200° C., and the temperature range of the heat-receiving fluid is 300-600° C.

5. The method according to claim 1, wherein the range of flow rate of the heat-receiving fluid is 5-100 m/s and the range of flow rate of the auxiliary fluid is 0-50 m/s.

* * * * *